United States Patent Office 3,171,778
Patented Mar. 2, 1965

3,171,778
BIOLOGICALLY ACTIVE APPLICATIONS OF HEXACHLORO-TRITHIANE-TETROXIDE AND TRIMETHYL-TRITHIANE-DIOXIDE
Frank B. Siezak and Russell M. Bimber, Painesville, Ohio, assignors to Diamond Alkali Company, Cleveland, Ohio, a corporation of Delaware
No Drawing. Filed Dec. 7, 1961, Ser. No. 157,821
7 Claims. (Cl. 167—33)

This invention relates broadly to the biological application of compounds represented by the structure:

(I)

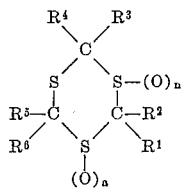

wherein $a$ and $n$ are numbers from 0 to 2, at least one of $a$ and $n$ being greater than O; $R^1$, $R^2$, $R^3$, $R^4$, $R^5$ and $R^6$ are selected from the group consisting of hydrogen atoms, alkyl radicals, especially lower alkyl radicals, e.g., methyl, ethyl, propyl, butyl, and their isomers, halogen atoms, i.e., fluorine, chlorine, bromine and iodine, chlorine being preferred, aryl radicals, such as phenyl or naphthyl radicals, alkaryl radicals, such as tolyl and xylyl radicals, aralkyl radicals, such as benzyl and phenethyl radicals, and haogen, hydroxy and nitro substituted derivatives of these radicals.

This is a continuation-in-part of our co-pending application Ser. No. 751,896, filed July 30, 1958, now U.S. 3,066,149.

More specifically, the present invention relates to novel compounds represented by the structure:

(II)

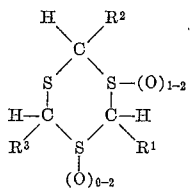

wherein $R^1$, $R^2$ and $R^3$ are selected from the group consisting of hydrogen atoms, alkyl radicals, especially lower alkyl radicals, e.g., methyl, ethyl, propyl, butyl, octyl, and their isomers, halogen atoms, as previously defined, chlorine being preferred, aryl radicals, such as phenyl or naphthyl radicals, alkaryl radicals, such as tolyl and xylyl radicals, aralkyl radicals, such as benzyl and phenethyl radicals, and halogen, hydroxy, and nitro substituted derivatives of these radicals, such as benzyl and phenother than hydrogen, and to their preparation and application.

Specific compounds falling within the scope of Structure I are:

(1) 2,2,4,4,6,6 - hexachloro - 1,3,5-trithiane-1,1,3,3-tetroxide
(2) 2,2,4,4,6,6-hexabromo-1,3,5-trithiane-1,1-dioxide
(3) 2,4,6-trimethyl-1,3,5-trithiane-1,1,3,3-tetroxide
(4) 2,4-diethyl-1,3,5-trithiane-1,1,3,3-tetroxide
(5) 2,4,6-tri-(p-tolyl)-1,3,5-trithiane-1,3,3-trioxide
(6) 2,4-dibenzyl-1,3,5-trithiane-1,1,3,3-tetroxide
(7) 2,4,6-triethyl-1,3,5-trithiane-1,1,3,3-tetroxide
(8) 2,4,6 - trichloro-2,4,6-trimethyl-1,3,5-trithiane-1,1,3,3-tetroxide
(9) 2,4,6-trichloro-1,3,5-trithiane-1,1,3,3-tetroxide
(10) 2-chloro-1,3,5-trithiane-1,1,3,3-tetroxide
(11) 2-iodo-1,3,5-trithiane-1,1,3-tetroxide
(12) 2,4,6-trimethyl-1,3,5-trithiane-1-oxide Specific compounds falling within the scope of Structure II above are:

(1) 2,4,6-trihalo-1,3,5-trithiane-1,3-dioxide
    (a) 2,4,6-trichloro-1,3,5-trithiane-1,3-dioxide
    (b) 2,4,6-tribromo-1,3,5-trithiane-1,3-dioxide
(2) 2,4-dihalo-1,3,5-trithiane-1,3-dioxide
    (a) 2,4-dichloro-1,3,5-trithiane-1,3-dioxide
    (b) 2,4-dibromo-1,3,5-trithiane-1,3-dioxide
(3) 2-halo-1,3,5-trithiane-1,3-dioxide
    (a) 2-chloro-1,3,5-trithiane-1,3-dioxide
    (b) 2-iodo-1,3,5-trithiane-1,3-dioxide
    (c) 2-bromo-1,3,5-trithiane-1,3-dioxide
(4) 2,4-dialkyl-1,3,5-trithiane-1,3-dioxide
    (a) 2,4-dimethyl-1,3,5-trithiane-1,3-dioxide
    (b) 2,4-diethyl-1,3,5-trithiane-1,3-dioxide
    (c) 2,4-diisopropyl-1,3,5-trithiane-1,3-dioxide
    (d) 2,4 - di - (2-haloethyl)-1,3,5-trithiane-1,3-dioxide
    (e) 2,4 - di(2 - nitroethyl)-1,3,5-trithiane-1,3-dioxide
    (f) 2,4 - di-(2-hydroxy-n-butyl)-1,3,5-trithiane-1,3-dioxide
(5) 2,4,6-trialkyl-1,3,5-trithiane-1,3-dioxide
    (a) 2,4,6-trimethyl-1,3,5-trithiane-1,3-dioxide
    (b) 2,4,6-triethyl-1,3,5-trithiane-1,3-dioxide
    (c) 2,4,6 - tri-n-propyl-1,3,5-trithiane-1,3-dioxide
    (d) 2,4,6-tri-n-butyl-1,3,5-trithiane-1,3-dioxide
(6) 2,4,6-triphenyl-1,3,5-trithiane-1,3-dioxide Broadly compounds of this invention may be prepared by oxidizing a 1,3,5-trithiane, e.g., 1,3-trithiane, 2,4,6-trimethyl - 1,3,5-trithiane, and 2,4,6-triphenyl-1,3,5-trithiane; however, it has now been found that compounds of the structure:

(III)

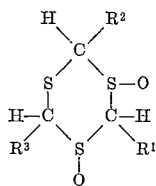

wherein $R^1$, $R^2$ and $R^3$ are selected from the group consisting of hydrogen atoms, alkyl radicals, especially lower alkyl radicals, i.e., methyl, ethyl, propyl, butyl, and their isomers, halogen atoms, as previously defined, chlorine being preferred, aryl radicals, such as phenyl or naphthyl radicals, alkaryl radicals, such as tolyl and xylyl radicals, aralkyl radicals, such as benzyl and phenethyl radicals, and halogen, hydroxy, and nitro substituted derivatives of these radicals, may be prepared by chemically reacting a compound of the structure:

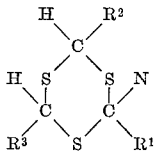

wherein $R^1$, $R^2$ and $R^3$ are as previously defined, with an oxidizing agent, e.g., potassium permanganate and hydrogen peroxide, hydrogen peroxide being preferred. This reaction is typically carried to completion requiring about one-half to five hours, e.g., one to two hours. The temperature is preferably maintained below 40° C. due to the reaction being exothermic and increasingly difficult to control at higher temperatures, e.g., above 70° C. The reactants may be mixed in about stoichiometric amounts, e.g., about two moles of hydrogen peroxide is chemically reacted with one mole of the substituted-1,3,5-trithiane, however, in certain instances a slight excess, e.g., 10–20% of hydrogen peroxide is desirable to maintain practical reaction speed and efficiency.

The desired products are solids, typically separated by recrystallization from an organic solvent, such as benzene, petroleum ether, acetone, a lower alcohol, e.g., methanol, ethanol, propanol, or water. The desired product is also soluble in acetone, acetic anhydride, and lower organic acids, e.g., acetic acid, pyruvic acid, and propionic acid.

Specifically preferred 2,4,6-trialkyl-1,3,5-trithiane-1,3-dioxides may be prepared by chemically reacting 2,4,6-trialkyl-1,3,5-trithianes with an oxidizing agent, e.g., hydrogen peroxide. The reactants are mixed in approximately stoichiometric ratios, i.e., one mole of the 2,4,6-trialkyl-1,3,5-trithiane being mixed with about two moles of hydrogen peroxide, preferably in the presence of acetic acid and water, such as the reaction of 99 to 102 g. of 2,4,6-trimethyl-1,3,5-trithiane dissolved in 1200 to 1550 ml. of acetic acid with 220 to 225 ml. of 25% hydrogen peroxide in water. The exothermic reaction is normally carried to completion typically at a temperature below 40° C., e.g., 5°–40° C. The resultant product is typically soluble in organic solvents, such as benzene, acetone and lower alcohols, e.g., methanol, ethanol, propanol, and lower organic acids, e.g., acetic acid, pyruvic acid, propionic acid and acetic anhydride.

Typically the 2,4,6-trialkyl-1,3,5-trithiane is separated or purified through distillation, preferably at reduced pressure, or through recrystallization from an organic solvent, e.g., benzene, petroleum ether, acetone, or a lower alcohol, such as methanol, ethanol, and propanol. Preferably the product is separated by recrystallization from a solvent such as benzene, giving the desired product.

The compounds of this invention exhibit a high degree of chemical reactivity, but more specifically a marked biological activity. Specifically, these compounds are active pesticides, e.g., fungicides, as in the control of plant and non-plant fungi, seed protections, insecticides, as for the control of aphids, nematocides as in the control of non-plant parasite nematodes, selective herbicides as in the control of undesirable plant growth, and for the control of microorganism growth, e.g., bactericides.

These compounds may be used alone or in combination with other known biologically-active materials, such as organic phosphate pesticides, chlorinated hydrocarbon insecticides, foliage and soil fungicides, pre- and post-emergent herbicides, and the like.

While compounds of this invention may be employed in a variety of applications, biologically-active or otherwise, it will be understood, of course, that such compounds may be utilized in diverse formulations, both liquid and solid, including finely-divided powders and granular materials, as well as liquids, such as solutions, concentrates, emulsifiable concentrates, slurries and the like, dictated by the application intended and the formulation media desired.

Thus, it will be appreciated that compounds of this invention may be employed to form biologically-active substances containing such compounds as essential active ingredients thereof, which compositions may also contain carriers, including finely-divided dry or liquid diluents, extenders, fillers, conditioners, including various clays, diatomaceous earth, talc, spent catalyst, or other silica material, solvents, diluents, etc., including water and various organic liquids, such as benzene, acetone, cyclohexanone, carbon disulfide, alcohols, organic acid salts, petroleum distillate fractions, and various mixtures thereof.

When liquid formulations are employed or dry materials prepared which are to be used in liquid form, it is desirable in certain instances additionally to employ a wetting, emulsifying or dispersing agent to facilitate use of the formulation, e.g., ionic and non-ionic surface-active agents, quaternary ammonium salts, alkyl aryl sulfonate surface-active agents, non-ionic polyoxyalkylene fatty ester surface-active agents, Triton X-155 (alklyarylpolyether alcohol, U.S. Patent No. 2,504,064). A detailed list of such agents is set forth in an article by John W. McCutcheon in Soap and Chemical Specialties, vol. 31, No. 7–10, 1955. In general, less than 10% by weight of the surface-active agent is present in the compositions of the invention and usually less than 1% by weight is present.

The term "carrier" employed in the specification and claims is intended to refer broadly to materials constituting a major proportion of the biologically-active or other formulations and, hence, includes finely-divided materials both liquid and solids as aforementioned conveniently used in such applications.

An embodiment of the invention is a sanitizing composition, that is, a composition employed in contacting or destroying conditions, organisms, or bacteria detrimental to either human or animal life, containing a sanitizing amount of a compound within the scope of Structure I. This is intended also to include carriers for the subject toxic ingredients. In practice, the method of sanitizing may be carried out by contacting the detrimental conditions, i.e., organisms, bacteria, and material, space or area infested, with a sanitizing amount of a compound within Structure I. It is obvious that the amount of toxic agent or sanitizing composition required will be dictated by the degree of infestation and the degree of sanitizing needed or desired and the material or environment to be sanitized.

A specific embodiment is the method of sanitizing a body of water employed for swimming or other purposes requiring sanitation, i.e., a swimming pool, comprising the addition thereto of a sanitizing amount of a compound of Structure I, and preferably 2,2,4,4,6,6-hexachloro-1,3,5-trithiane-1,1,3,3-tetroxide. It has been found that a compound suitable for swimming pool sanitation should have an available chlorine content in a saturated aqueous solution of about 1.5 to 2.75 p.p.m. A lower concentration of available chlorine is ineffective and a higher one causes a source of skin and eye irriation. In view of the fact that the available chlorine content of a saturated aqueous solution of 2,2,4,4,6,6-hexachloro-1,3,5-trithiane-1,1,3,3-tetroxide is about 2.6, this compound lends itself to the method of sanitizing, and specifically the method of sanitizing water, i.e., in swimming pools and water suitable for swimming, comprising contacting the conditions, i.e., the water, to be sanitized with a sanitizing amount of a compound within Structure I. A preferred application is the method of sanitizing swimming pools comprising the adding to the water thereof a sanitizing amount of the above hexachloro-trithiane-tetroxide.

In order that those skilled in the art may more completely understand the present invention and the preferred methods by which the same may be carried into effect, the following specific examples are offered:

EXAMPLE I

*Preparation of 2,2,4,4,6,6-hexachloro-1,3,5-trithiane-1,1, 3,3-tetroxide*

This preparation is based on the article by W. V. Farrar in the Journal of the Chemical Society, 1956, page 508.

515 g. NaOH is dissolved in 1580 ml. distilled water and cooled while chlorine is added to form NaOCl. 79 g. NaHCO$_3$ dissolved in 1580 ml. distilled water is then added. Cooling by an ice salt water bath and stirring is continued while 79 g. (0.57 mol) 1,3,5-trithiane is added in portions over a 45-minute period. The temperature is held below 27° C. throughout the addition even though the reaction is exothermic. Upon reaction completion the reaction mixture is allowed to warm to room temperature. The desired product is isolated by recrystallization from acetone, yielding pure 2,2,4,4,6,6-hexachloro-1, 3,5-trithiane-1,1,3,3-tetroxide, M.P. 202°–203° C.

EXAMPLE II

Fungicidal activity of the above hexachloro-trithiane-tetroxide is demonstrated through spore germination tests on glass slides which are conducted via the test tube dilution method adopted from the procedure recommended by the American Phytopathological Society's Committee on Standardization of Fungicidal Tests. In this procedure, the product of Example I in aqueous formulation at concentrations of 1000, 100, 10 and 1.0 p.p.m. is tested for its ability to inhibit germination of spores from 7 to 10-day old cultures of *Alternaria oleracea* and *Monilinia fructicola*. Germination records are taken after 20 hours of incubation at 22° C. by counting 100 spores. Results indicate that a concentration of less than 0.1 to 1.0 p.p.m. for the *Al oleracea* and *M. fructicola*, respectively, affords disease control.

EXAMPLE III

Fungicidal utility is further demonstrated through a tomato foliage disease test measuring the ability of the product of Example I to protect tomato foliage against infection by the early blight fungus, *Alternaria solani*. Tomato plants 5 to 7 inches high of the variety Bonny Best are employed. The plants are sprayed with 100 ml. of test formulation at 512 p.p.m., and 256 p.p.m., test chemical in combination with 5% acetone, 0.01% Triton X-155, and the balance water at 40 pounds air pressure, while being rotated on a turntable in a spray chamber. After the spray deposit is dry the treated plants and comparable untreated controls are sprayed with a spore suspension containing approximately 20,000 conidia of *A. solani* per ml. The plants are held in a saturated atmosphere for 24 hours at 70° F. to permit spore germination and infection. After two to four days, lesion counts are made on the three uppermost fully expanded leaves. Data based on the number of lesions obtained on the control plants shows 100% disease control at the above concentrations.

EXAMPLE IV

Fungicidal utility is demonstrated also by the ability of the product of Example I to protect tomato plants against the late blight fungus, *Phytophthora infestans*. The method employs tomato plants 5 to 7 inches high of the variety Bonny Best. 100 ml. of the test formulation at 400 p.p.m. and 256 p.p.m. test chemical in combination with 5% acetone, 0.01% Triton X-155, and the balance water is sprayed on the plants at 40 pounds air pressure while the plants are being rotated on a turntable in a spray chamber. After the spray deposit is dry the treated plants and comparable untreated controls are sprayed with a spore suspension containing approximately 150,000 sporangia of *P. infestans* per ml. The plants are held in a saturated atmosphere for 24 hours at 60° F. to permit spore germination and infection. After two to four days lesion counts are made on the three uppermost fully expanded leaves. Comparing the number of lesions on the test plants and control plants shows better than 97% disease control at the above concentrations.

EXAMPLE V

Still a further test measures the ability of the product of Example I to protect pea seeds and seedlings from seed decay and damping off fungi (Pythium Fusarium). In this test infected soil in 4 x 4 x 3-inch plant band boxes is treated by a soild drench mix method at the rate of 128 pounds per acre. Treatment is accomplished by pouring 70 ml. of a 2000 p.p.m. aqueous formulation (2000 p.p.m. test chemical—5% acetone—0.01% Triton X-155—remainder water) on the surface of the soil. This is allowed to stand until the next day when the soil is removed from each box and thoroughly mixed before being replaced in the box. Untreated checks and standardized material are included in each test in addition to a check planted in sterilized soil. Percentage stand recorded 14 days after planting shows 96% stand compared to 4% stand on the untreated controls.

EXAMPLE VI

To test herbicidal effectiveness of the product of Example I, tomato plants, variety Bonny Best, 5 to 7 inches tall; corn, variety Cornell M-1 (field corn), 4 to 6 inches tall; bean, variety Tendergreen, just as the trifoliate leaves are beginning to unfold; and oats, variety Clinton, 3 to 5 inches tall, are sprayed with 100 ml. of an aqueous test formulation (3200 and 1600 p.p.m. test chemical—5% acetone—0.01% Triton X-155—balance water) at 40 pounds' air pressure while being rotated on a turntable in a spray chamber. Records are taken 14 days after treatment and phytotoxicity is rated on a scale from 0 for no injury to 11 for plant kill. Using this procedure each plant had a rating of 0 at each concentration, thus demonstrating the product of Example I would not be phytotoxic to plants in fungicidal applications.

EXAMPLE VII

To evaluate the effect of the product of Example I on the germination of seeds in soil, a mixture of seeds of six crop plants is broadcast in 8 x 8 x 2-inch metal cake pans filled to within ½-inch of the top with composted greenhouse soil. The seed is uniformly covered with about ¼-inch of soil and water. After 24 hours 80 ml. of an aqueous test formulation containing 320 mg. test compound is sprayed at 10 pounds air pressure uniformly over the surface of the pan. This is equivalent to 64 pounds per acre. The seed mixture contains seeds of three broadleafs: turnip, flax, alfalfa; and three grasses: wheat, millet, and rye grass. Two weeks after treatment records are taken on seedling stands as compared to the controls. Using this procedure results show 40% stand for the broadleaf and 90% stand for the grass.

EXAMPLE VIII

In order to make an in vitro evaluation of the product of Example I as a contact poison, non-plant parasite nematodes, *Panagrellus redivivus*, are exposed to the test chemical in small watch glasses (27 mm. diameter x 8 mm. deep), within a 9 cm. Petri dish. An aqueous test formulation (1000 p.p.m. product of Example I—5% acetone —0.01% Triton X-155—balance water) is used. Results are recorded 24 hours after treatment showing 100% mortality at the above concentration.

EXAMPLE IX 100.5 g. of 2,4,6-trimethyl-1,3,5-trithiane (M.P. 70°–80° C.) is dissolved in 1500 ml. acetic acid and 223 ml. of 25% in $H_2O_2$ in aqueous solution is run in slowly with stirring and cooling. The reactant temperature is maintained below 35° C. throughout the reaction; upon reaction completion the mixture is filtered and solvent is distilled off under reduced pressure resulting in 700 ml. of residue which is allowed to evaporate and crystallize. The resulting partially liquid mass is cooled and filtered. The viscous liquid filtrate is allowed to evaporate further, yielding a total of 43 gm. of orange yellow solid. This solid is recrystallized from a liter of hot benzene resulting in a crystalline white solid, M.P. 180°–184° C. Upon drying this desired product, $C_6H_{12}O_2S_3$, melts at 181.0–182.5° C. and is indicated through the following elemental analytical data:

| Element | Actual Percent by Wt. | Calculated Percent by Wt. |
| --- | --- | --- |
| C | 33.73 | 33.85 |

EXAMPLE X

To evaluate insecticidal activity a test is carried out whereby adult two-spotted spider mites, *Tetranychus*

*bimaculatus*, maintained on Tendergreen beans under controlled conditions are transferred from a stock culture by leaf cuttings to uninfested seed leaves of bean plants in 2½ inch pots the day prior to testing. An aqueous formulation of the product of Example IX (2000 p.p.m.—5% acetone—0.01% Triton X-155—balance water) is sprayed onto the infested test plants. Counts are made after two days showing better than 40% insect mortality.

EXAMPLE XI

Further insecticidal utility is shown in the following test: the bean aphid *Aphis fabae*, is cultured on nasturtium plants. No attempt is made to select insects of a given age in this test. Selected test plants are infested with approximately 100 aphids; these plants are treated with a formulation of the test chemical (2000 p.p.m. product of Example IX—5% acetone—0.01% Triton X-155—balance water). Based on counts made 24 hours after exposure better than 50% aphid mortality is observed.

EXAMPLE XII

Employing the fungicidal evaluation concerning the early blight fungus, *Alternaria solani*, given in Example III, the product of Example IX affords 100% disease control at a concentration of 400 p.p.m.

EXAMPLE XIII

Further fungicidal utility of the product of Example IX is demonstrated using the procedure given in Example IV. Employing this test results indicate 100% disease control at the 2000 p.p.m. concentration.

EXAMPLE XIV

The product of Example IX demonstrates no phytotoxicity on tomato plants, corn plants, bean plants, or oat plants at a concentration of 6400 p.p.m. using the procedure given in Example VI.

EXAMPLE XV

Whereas the procedure given in Example XIV used a spray application method, an evaluation to determine the effects of applying the product of Example IX to the soil around the plants is carried out using tomato plants, variety Bonny Best, 5 to 7 inches tall, and corn plants, variety M-1 (field corn), 4 to 6 inches tall which are treated by pouring 51 ml. of a 2000 p.p.m. aqueous test formulation (2000 p.p.m. test chemical—5% acetone—0.01% Tritone X-155—balance water) onto the soil of 4-inch pots in which the plants are growing. The plants are held under controlled greenhouse conditions for at least ten days before examination after which phytotoxicity ratings are given based on the scale from 0 for no injury to 11 for plant kill. Using this procedure the product of Example IX caused no injury to the plant, receiving a rating of 0.

It is to be understood that although the invention has been described with specific reference to particular embodiments thereof, it is not to be so limited since changes and alterations therein may be made which are in the full intended scope of this invention as defined by the appended claims.

What is claimed is:

1. The method of controlling fungus growth which comprises contacting said fungus with a fungicidal amount of 2,2,4,4,6,6-hexachloro-1,3,5-trithiane-1,1,3,3-tetroxide.

2. The method of protecting seeds against fungi infestation which comprises contacting said seeds with a fungicidal amount of 2,2,4,4,6,6-hexachloro-1,3,5-trithiane-1,1,3,3-tetroxide.

3. The method of protecting foliage against fungi infestation which comprises contacting said foliage with a fungicidal amount of 2,2,4,4,6,6-hexachloro-1,3,5-trithiane-1,1,3,3-tetroxide.

4. The method of controlling nematode growth which comprises contacting said nematodes with a nematocidal amount of 2,2,4,4,6,6-hexachloro-1,3,5-trithiane-1,1,3,3-tetroxide.

5. The method of controlling insect growth which comprises contacting said insects with an insecticidal amount of 2,4,6-trimethyl-1,3,5-trithiane-1,3-dioxide.

6. The method of controlling fungus growth which comprises contacting said fungus with a fungicidal amount of 2,4,6-trimethyl-1,3,5-trithiane-1,3-dioxide.

7. The method of sanitizing water which comprises incorporating therein 2,2,4,4,6,6-hexachloro-1,3,5-trithiane-1,1,3,3-tetroxide in an amount to provide an available chlorine content of between about 1.5 and 2.75 p.p.m.

References Cited in the file of this patent
UNITED STATES PATENTS

| | | |
|---|---|---|
| 2,774,707 | Birum | Dec. 18, 1955 |
| 2,841,524 | Birum | July 1, 1958 |
| 2,841,525 | Birum et al. | July 1, 1958 |
| 2,943,977 | Wadsworth et al. | July 5, 1960 |
| 2,957,801 | Birum | Oct. 25, 1960 |

OTHER REFERENCES

Sexton: "The Organic Chemist's Approach to Chemotherapy," pp. 1–13, "Selective Toxicity and Antibiotics," Soc. Exp. Biol. Symposia No. III, vol. III (1949).

UNITED STATES PATENT OFFICE
CERTIFICATE OF CORRECTION

Patent No. 3,171,778                                            March 2, 1965

Frank B. Slezak et al.

It is hereby certified that error appears in the above numbered patent requiring correction and that the said Letters Patent should read as corrected below.

Column 1, line 21, for "$R^3$." read -- $R^3$, --; line 30, for "haogen" read -- halogen --; line 53, strike out "such as benzyl and phen-", and insert instead -- at least one R being --; column 3, line 38, for "protections" read -- protectants --; column 5, line 15, for "Al", in italics, read -- A. --, in italics; line 66, for "soild" read -- soil --; column 7, line 48, for "Tritone" read -- Triton --.

Signed and sealed this 10th day of August 1965.

(SEAL)
Attest:

ERNEST W. SWIDER                                            EDWARD J. BRENNER
Attesting Officer                                               Commissioner of Patents